United States Patent
Asayama et al.

(10) Patent No.: US 9,932,962 B2
(45) Date of Patent: Apr. 3, 2018

(54) AIRFLOW GENERATION DEVICE AND WIND POWER GENERATION SYSTEM

(71) Applicant: KABUSHIKI KAISHA TOSHIBA, Minato-ku (JP)

(72) Inventors: Masahiro Asayama, Yokohama (JP); Kenichi Yamazaki, Yokohama (JP); Motofumi Tanaka, Yokohama (JP); Toshiki Osako, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 204 days.

(21) Appl. No.: 14/881,373

(22) Filed: Oct. 13, 2015

(65) Prior Publication Data

US 2016/0115940 A1    Apr. 28, 2016

(30) Foreign Application Priority Data

Oct. 28, 2014 (JP) .................................. 2014-219079

(51) Int. Cl.
*F03D 7/02* (2006.01)
*F03D 11/00* (2006.01)
(Continued)

(52) U.S. Cl.
CPC .............. *F03D 7/02* (2013.01); *F03D 1/0633* (2013.01); *F03D 1/0675* (2013.01); *F03D 7/022* (2013.01);
(Continued)

(58) Field of Classification Search
CPC ............... G03G 15/02; G03G 15/0216; G03G 15/0233; G03G 15/0266; H01T 19/00;
(Continued)

(56) References Cited

U.S. PATENT DOCUMENTS

| 4,941,961 A | 7/1990 | Noguchi et al. |
| 6,719,272 B1 | 4/2004 | Iwata |

(Continued)

FOREIGN PATENT DOCUMENTS

| DE | 196 36 746 A1 | 3/1998 |
| JP | 1-272799 A | 10/1989 |

(Continued)

OTHER PUBLICATIONS

Office Action dated Aug. 26, 2016 in Korean Patent Application No. 10-2015-0145148 with English translation.

(Continued)

*Primary Examiner* — Thienvu Tran
*Assistant Examiner* — Nicolas Bellido
(74) *Attorney, Agent, or Firm* — Oblon, McClelland, Maier & Neustadt, L.L.P.

(57) ABSTRACT

An airflow generation device disposed on a moving body such as a windmill blade in which a conduction state of an electrode can be sufficiently secured, and the like are provided. An airflow generation device of an embodiment includes a base, a first electrode, and a second electrode, and generates an airflow when a voltage is applied between the first electrode and the second electrode. The base is formed of a dielectric having a flexibility. The first electrode is provided on a front surface side of the base. The second electrode is provided inside the base. Here, the first electrode includes a metal electrode part and an elastomeric electrode part. The metal electrode part is formed of a metal material. The elastomeric electrode part is formed by using an elastomeric material, and has a conductivity. Further, the elastomeric electrode part includes a portion covering the metal electrode part.

6 Claims, 4 Drawing Sheets

(51) Int. Cl.
*F03D 11/04* (2006.01)
*F03D 9/00* (2016.01)
*F02D 1/06* (2006.01)
*F03D 1/06* (2006.01)
*F15D 1/00* (2006.01)
*F03D 9/25* (2016.01)
*F03D 17/00* (2016.01)
*F03D 13/20* (2016.01)

(52) U.S. Cl.
CPC ............... *F03D 9/25* (2016.05); *F03D 13/20* (2016.05); *F03D 17/00* (2016.05); *F15D 1/0075* (2013.01); *Y02E 10/721* (2013.01); *Y02E 10/723* (2013.01); *Y02E 10/725* (2013.01)

(58) Field of Classification Search
CPC ....... B64C 11/24; B64C 11/16; F04D 29/681; F04D 25/088; Y02T 50/673; F01D 7/02; F01D 5/145; Y02E 10/723; Y02E 10/721; Y02E 10/74; Y02E 10/722; Y02E 10/725; F03D 11/0033; F03D 11/00; F03D 7/06; F03D 13/20; F03D 17/00; F03D 9/25; F03D 7/02; F03D 1/0633; F03D 1/0675; F03D 7/022; F03D 11/0091; F03D 11/04; F03D 9/002; B64D 41/007; F17D 1/16; F17D 1/17; H05K 3/108; H05K 3/062; H05K 3/061; H05K 3/064; H05K 3/067; C09K 3/00; F15D 1/0075
USPC ......................................................... 361/225
See application file for complete search history.

(56) References Cited

U.S. PATENT DOCUMENTS

| | | | | |
|---|---|---|---|---|
| 7,999,173 B1* | 8/2011 | Ashpis | ................ | H01L 31/042 136/244 |
| 8,382,042 B2* | 2/2013 | Sanderson | ............. | B29C 44/56 244/201 |
| 8,704,423 B2* | 4/2014 | Stewart | ................ | B29C 70/882 174/120 SR |
| 2006/0192465 A1* | 8/2006 | Kornbluh | .................. | B64C 3/48 310/309 |
| 2009/0212164 A1* | 8/2009 | Osborne | ............... | B64C 23/005 244/205 |
| 2010/0329838 A1* | 12/2010 | Greenblatt | ............ | B64C 23/005 415/1 |
| 2012/0193483 A1* | 8/2012 | Essenhigh | ............. | B64C 23/005 244/205 |
| 2012/0267892 A1* | 10/2012 | Matsuda | ................. | F03D 7/022 290/44 |
| 2012/0280501 A1* | 11/2012 | Tanaka | .................... | F03D 7/022 290/44 |
| 2012/0287550 A1* | 11/2012 | Tanaka | ...................... | F01D 5/14 361/225 |
| 2013/0292511 A1* | 11/2013 | Osborne | ................ | B64C 23/005 244/75.1 |
| 2014/0286789 A1* | 9/2014 | Matsuda | ................. | F03D 7/022 416/90 R |

FOREIGN PATENT DOCUMENTS

| | | | |
|---|---|---|---|
| JP | 8-158808 A | 6/1996 | |
| JP | 10-89530 A | 4/1998 | |
| JP | 11-141731 A | 5/1999 | |
| JP | 2000-337550 A | 12/2000 | |
| JP | 2001-12093 A | 1/2001 | |
| JP | 2007-317656 | 12/2007 | |
| JP | 2008-1354 | 1/2008 | |
| KR | 10-1381872 B1 | 3/2014 | |
| KR | 10-2014-0115963 A | 10/2014 | |
| TW | 509765 | 11/2002 | |
| WO | WO 2006/040532 A1 | 4/2006 | |
| WO | WO 2006040532 A1 * | 4/2006 | ........... B64C 23/005 |

OTHER PUBLICATIONS

Extended European Search Report dated Mar. 29, 2016 in Patent Application No. 15189584.4.
Office Action dated May 19, 2017 in Taiwanese Patent Application No. 104116826.

* cited by examiner

US 9,932,962 B2

AIRFLOW GENERATION DEVICE AND WIND POWER GENERATION SYSTEM

CROSS-REFERENCE TO RELATED APPLICATION

This application is based upon and claims the benefit of priority from the prior Japanese Patent Application No. 2014-219079, filed on Oct. 28, 2014; the entire contents of all of which are incorporated therein by reference.

FIELD

Embodiments described herein relate generally to an airflow generation device and a wind power generation system.

BACKGROUND

An airflow generation device which generates an airflow by generating a plasma through a discharge, has been proposed. The airflow generation device is disposed on, for example, a moving body such as a windmill blade (blade) in a fluid apparatus such as a wind power generation system.

A wind power generation system generates power by utilizing wind power energy being renewable energy. In the wind power generation system, when a wind speed and a wind direction suddenly fluctuate, a speed triangle around a windmill blade greatly deviates from a rating point, so that a separated flow sometimes occurs in a wide range. When the wind speed and the wind direction suddenly fluctuate, it is not easy to sufficiently respond to the fluctuations by adjustment of a yaw angle or a pitch angle. As a result of this, in the wind power generation system, there may be cases where it is difficult to keep a power generation output to a stable one, and it is not easy to increase an efficiency. As a measure for this, it has been proposed to use an airflow generation device to generate an airflow at a surface of a windmill blade, to thereby suppress the occurrence of separated flow. In the airflow generation device, a pair of electrodes are provided to a base formed of a dielectric, and the device is disposed on the surface of the windmill blade. Further, the airflow generation device generates an airflow by applying a voltage of about 1 to 10 kV, for example, between the pair of electrodes to generate a plasma.

As described above, by appropriately controlling a flow of fluid in a periphery of a moving body such as a windmill blade by using the airflow generation device, it is possible to realize an efficiency regarding an operation of a fluid apparatus. Further, it is possible to suppress a generation of vibration and noise in the fluid apparatus.

However, in the airflow generation device disposed on the moving body such as the windmill blade, there is a case where a flying object such as a piece of hail or graupel collides with the device, which damages an electrode and causes disconnection. As a result of this, there may be cases where it is not easy for the airflow generation device to effectively generate the airflow, and it becomes difficult to appropriately control the flow in the periphery of the moving body such as the windmill blade. Further, when a thickness of the electrode is increased to prevent the occurrence of disconnection, the electrode becomes difficult to be deformed, so that it becomes sometimes difficult to dispose the airflow generation device.

Therefore, a problem to be solved by the present invention is to provide an airflow generation device disposed on a moving body such as a windmill blade in which a conduction state of an electrode can be sufficiently secured, and a wind power generation system.

DETAILED DESCRIPTION

An airflow generation device of an embodiment includes a base, a first electrode, and a second electrode, and generates an airflow when a voltage is applied between the first electrode and the second electrode. The base is formed of a dielectric having a flexibility. The first electrode is provided on a front surface side of the base. The second electrode is provided inside the base. Here, the first electrode includes a metal electrode part and an elastomeric electrode part. The metal electrode part is formed of a metal material. The elastomeric electrode part is formed by using an elastomeric material, and has a conductivity. Further, the elastomeric electrode part includes a portion covering the metal electrode part.

Embodiments will be described with reference to the drawings.

[Configuration of Wind Power Generation System 1]

Figure 1:
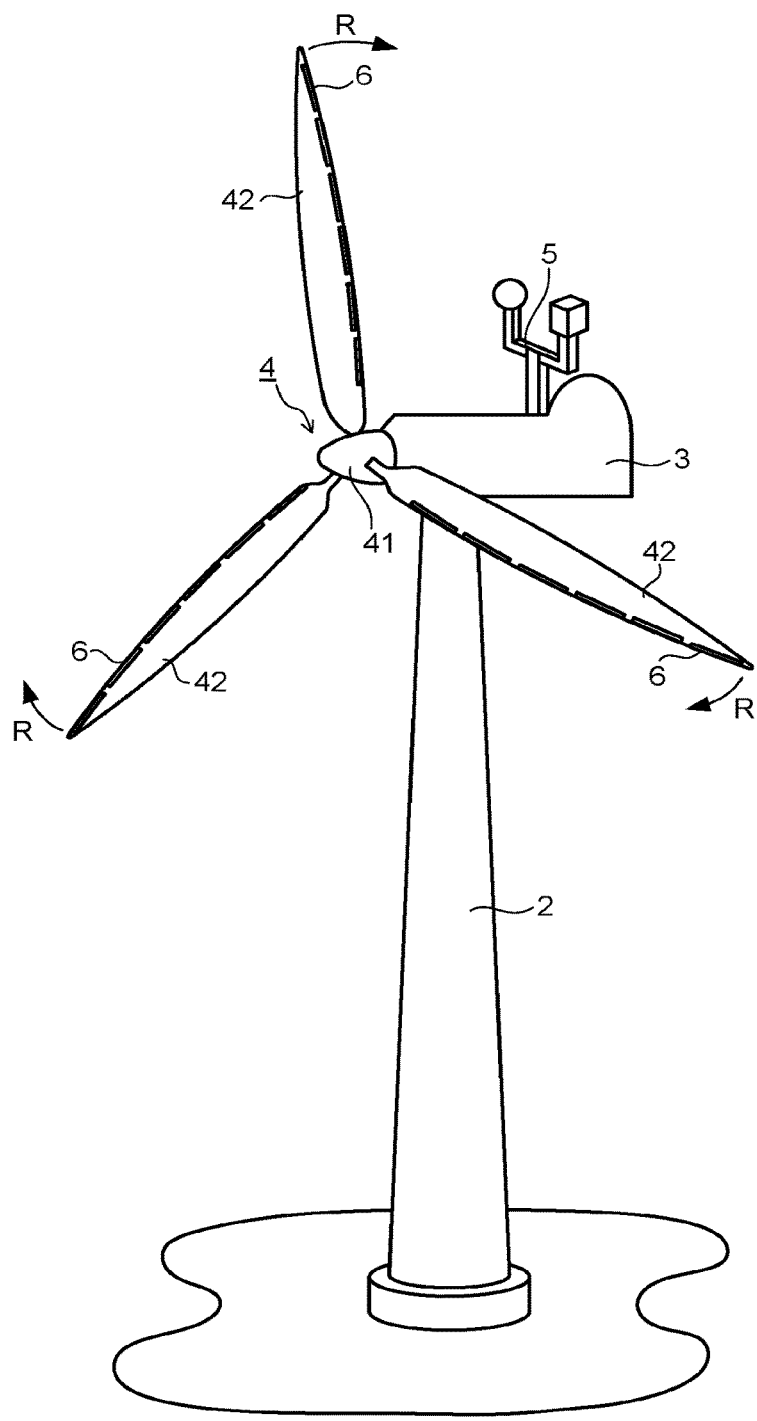
FIG. 1 is a perspective view schematically illustrating an entire configuration of a wind power generation system according to an embodiment.

FIG. 1 is a perspective view schematically illustrating an entire configuration of a wind power generation system according to an embodiment.

A wind power generation system 1 is, for example, an up-wind type propeller windmill, and includes a tower 2, a nacelle 3, a rotor 4, an aerovane unit 5, and airflow generation devices 6, as illustrated in FIG. 1.

In the wind power generation system 1, the tower 2 extends along a vertical direction, and a lower end portion thereof is fixed to a base (whose illustration is omitted) embedded in the ground.

In the wind power generation system 1, the nacelle 3 is disposed at an upper end portion of the tower 2. The nacelle 3 is supported to be rotatable about an axis in the vertical direction at the upper end portion of the tower 2, in order to adjust a yaw angle. Although the illustration is omitted, a power generator (whose illustration is omitted) is housed inside the nacelle 3.

In the wind power generation system 1, the rotor 4 is supported to be rotatable at one side end portion of the nacelle 3, and rotates in a rotational direction R with a horizontal direction set as a rotational axis, for example. Further, the rotor 4 is coupled to a rotary shaft of the power generator (whose illustration is omitted) housed inside the nacelle 3. The rotor 4 includes a hub 41 and a plurality of windmill blades 42 (blades).

In the rotor 4, the hub 41 includes a tip cover whose outer shape is a semiellipsoidal shape, and the tip cover is formed to have an outside diameter of an outer peripheral surface which increases from a windward side to a leeward side. In the rotor 4, the plurality of windmill blades 42 are respectively provided at intervals in the rotational direction R around the hub 41. For example, three windmill blades 42 are provided, and each of the blades has one end supported to be rotatable on the hub 41, in order to adjust a pitch angle.

In the wind power generation system 1, the aerovane unit 5 is attached to an upper surface of the nacelle 3, at the leeward side of the windmill blade 42. The aerovane unit 5 conducts measurement regarding a wind speed and a wind direction, and outputs data obtained by the measurement to a control unit (whose illustration is omitted). Further, the control unit performs, in accordance with the measured data, the adjustment of the yaw angle and the pitch angle. Further, the control unit controls the operation of the airflow generation device 6, in accordance with the measured data.

In the wind power generation system 1, the airflow generation device 6 is disposed on the windmill blade 42. Here, in each of the plurality of windmill blades 42, a plurality of airflow generation devices 6 are disposed so as to be arranged side by side in a span direction.

[Configuration of Airflow Generation Device 6]

Figure 2:
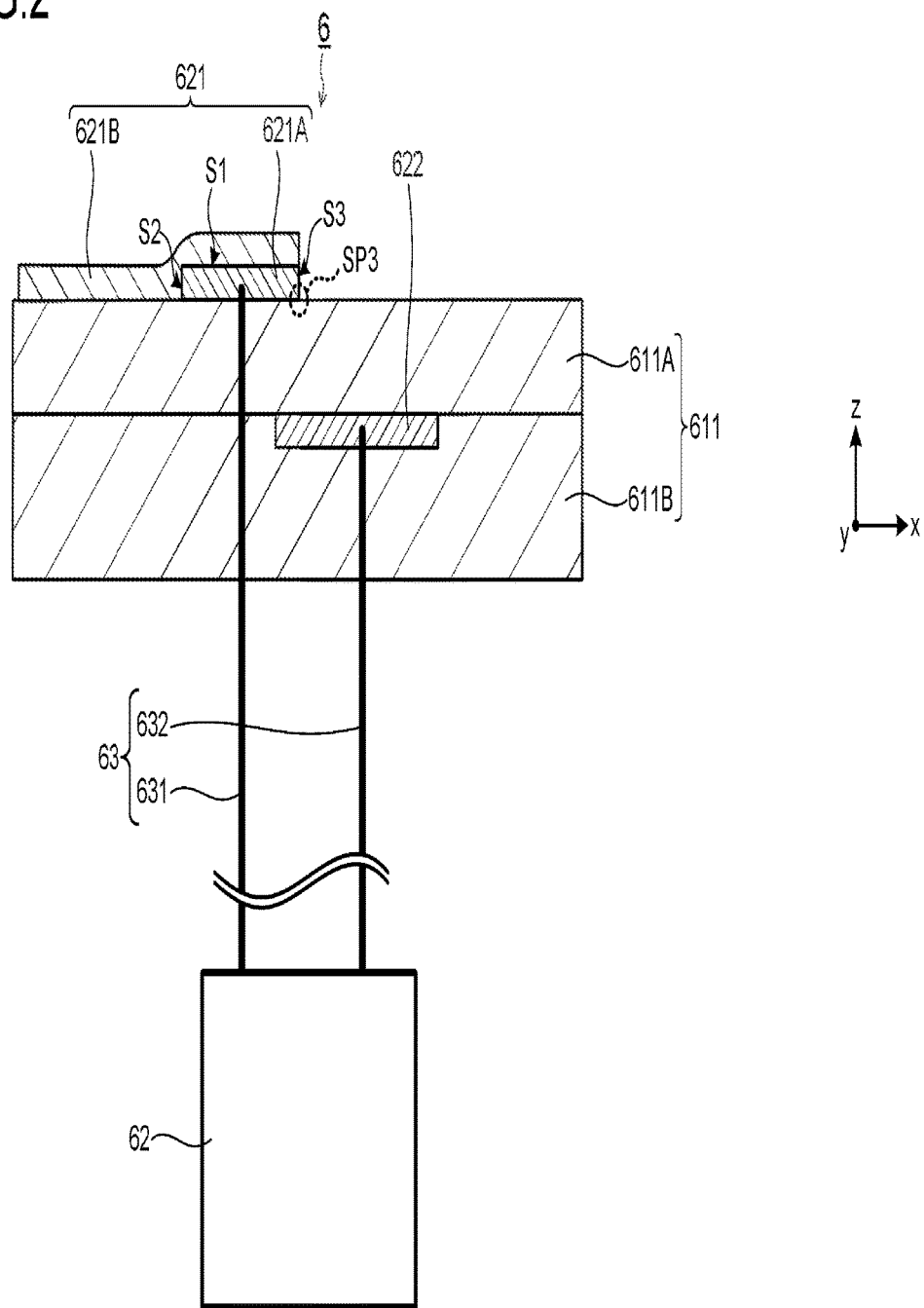
FIG. 2 is a view schematically illustrating an airflow generation device in the wind power generation system according to the embodiment.
Figure 3:
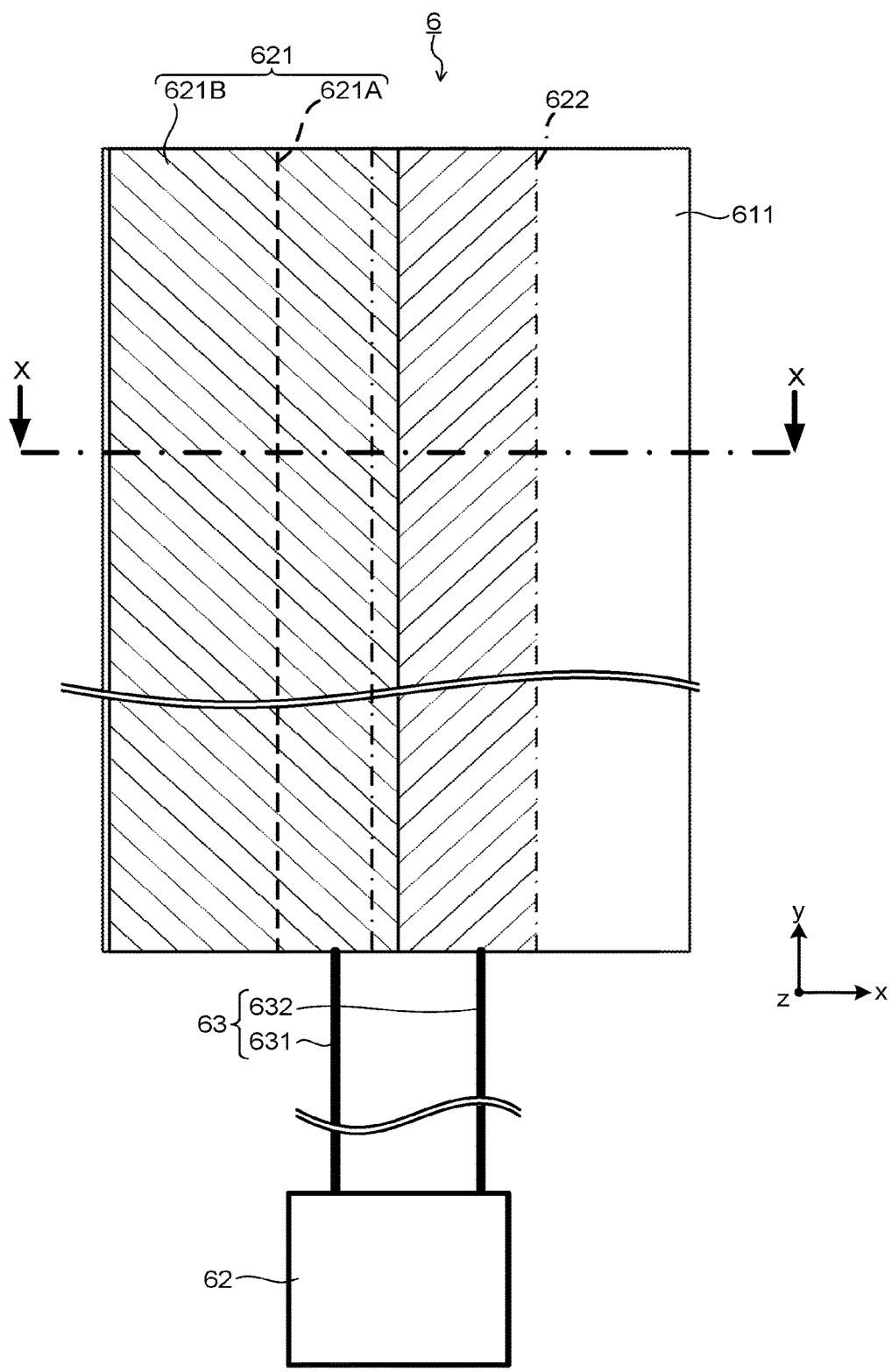
FIG. 3 is a view schematically illustrating the airflow generation device in the wind power generation system according to the embodiment.

FIG. 2 and FIG. 3 are views each schematically illustrating an airflow generation device in a wind power generation system according to an embodiment. FIG. 2 illustrates a cross section of the airflow generation device, and FIG. 3 illustrates an upper surface of the airflow generation device. FIG. 2 corresponds to a cross section of an X-X portion in FIG. 3. Further, in FIG. 3, a contour of a part of a member that forms the airflow generation device is indicated by a dotted line or a dashed line. In addition, an electrical connection relation between the airflow generation device 6 and a voltage application unit 62 is also illustrated in FIG. 2 and FIG. 3.

As illustrated in FIG. 2 and FIG. 3, the airflow generation device 6 includes a base 611, a first electrode 621, and a second electrode 622, in which the base 611 is provided with the first electrode 621 and the second electrode 622. Here, the first electrode 621 is provided on a front surface side of the base 611 formed of a dielectric, and the second electrode 622 is provided inside the base 611.

Further, the airflow generation device 6 is electrically connected to the voltage application unit 62 via a connecting part 63, and is configured to generate an airflow when the voltage application unit 62 applies a voltage between the first electrode 621 and the second electrode 622.

As illustrated in FIG. 1, the airflow generation device 6 is disposed on the windmill blade 42. Here, the airflow generation device 6 is disposed on a surface of the windmill blade 42 so that a longitudinal direction of the airflow generation device 6 is along a blade span (blade width) direction.

Although the illustration is omitted, the airflow generation device 6 is bonded to the windmill blade 42 so that its rear surface (lower surface) positioned on an opposite side of its front surface (upper surface) on which the first electrode 621 is provided, closely adheres to the surface of the windmill blade 42, for example. For instance, the airflow generation device 6 is disposed on a leading edge portion of a surface on a blade back side (upper surface) in the windmill blade 42. Here, the airflow generation device 6 is disposed so that the first electrode 621 and the second electrode 622 are sequentially arranged from the leading edge to a trailing edge.

Details of respective parts which form the airflow generation device 6 will be described in order.

(Base 611)

In the airflow generation device 6, the base 611 has a first base part 611A and a second base part 611B, as illustrated in FIG. 2 and FIG. 3.

The first base part 611A has a plate shape, and has a cross section perpendicular to a longitudinal direction (y direction) (xz plane) with a quadrangular shape. In the first base part 611A, the first electrode 621 is provided on a front surface (upper surface) thereof, and the second electrode 622 is provided on a rear surface (lower surface) thereof.

The second base part 611B has a plate shape, in a similar manner to the first base part 611A, and has a cross section perpendicular to the longitudinal direction (y direction) (xz plane) with a quadrangular shape. The second base part 611B is provided on the rear surface of the first base part 611A so as to cover the second electrode 622.

In the base 611, each of the first base part 611A and the second base part 611B is formed of a dielectric (insulating material) having a flexibility. For example, each of the first base part 611A and the second base part 611B is formed by using a resin such as a silicone resin, a polyimide resin, an epoxy resin, or a fluorocarbon resin, and is flexible.

The base 611 may also be, other than the above, one formed by stacking a plurality of prepreg sheets obtained by impregnating mica paper with an epoxy resin.

(First Electrode 621)

In the airflow generation device 6, the first electrode 621 is a front surface electrode provided on a front surface side of the base 611, and has a metal electrode part 621A and an elastomeric electrode part 621B, as illustrated in FIG. 2 and FIG. 3.

In the first electrode 621, the metal electrode part 621A is a plate-shaped body, and is formed of a metal material of, for example, copper, nickel, titanium, molybdenum, tungsten, or the like. The metal electrode part 621A may also be formed of an alloy, for example.

Here, the metal electrode part 621A is provided on the front surface of the base 611. Specifically, the metal electrode part 621A is provided on the upper surface of the first base part 611A of the base 611, positioned on an opposite side of the lower surface of the first base part 611A on which the second base part 611B is provided. For example, the metal electrode part 621A is bonded to the upper surface of the first base part 611A. The metal electrode part 621A linearly extends along the longitudinal direction (y direction) of the base 611, and has a cross section perpendicular to the longitudinal direction (y direction) (yz plane) with a quadrangular shape, for example.

In the first electrode 621, the elastomeric electrode part 621B has the conductivity, in a similar manner to the metal electrode part 621A, but, it is different from the metal electrode part 621A in a point that it is formed by using an elastomeric material. Specifically, the elastomeric electrode part 621B has the flexibility higher than that of the metal electrode part 621A, and thus is easily elastically-deformable. For example, the elastomeric electrode part 621B is formed by dispersing a conductive particle (conductive filler) in an elastomeric material. For example, as the elastomeric material, an organic polymeric material such as a silicone resin or a hydrogenated nitrile rubber(HNBR) is used. Other than the above, an ethylene-propylene-diene rubber (EPDM) has a high withstand voltage characteristic and is excellent in weather resistance, so that it can be suitably used for the elastomeric material. Further, for example, a fine particle made of carbon, and a fine particle formed of a metal material such as silver are used as the conductive particles. In order to sufficiently secure the conductivity, it is preferable to use the fine particle formed of the metal material as the conductive particle. In the elastomeric electrode part 621B, a content ratio of the elastomeric material is, for example, not less than 30 mass % nor more than 60 mass %, and a content ratio of the conductive particle is, for example, not less than 40 mass % nor more than 70 mass %. Other than the above, the elastomeric electrode part 621B may also be formed by using a conductive polymeric elastomer, in which no conductive particle is contained. As the conductive polymeric elastomer, for example, polythiophene can be suitably used, from a point of view of stability.

The elastomeric electrode part 621B is provided on the front surface of the base 611, in a similar manner to the metal electrode part 621A. Specifically, the elastomeric electrode part 621B is provided on the upper surface of the first base part 611A.

Further, the elastomeric electrode part 621B linearly extends along the longitudinal direction (y direction) of the base 611 so that it includes a portion covering the metal electrode part 621A. Concretely, the elastomeric electrode part 621B is formed so as to cover an upper surface S1 of the metal electrode part 621A and a side edge surface S2, positioned on the opposite side of the second electrode 622, in the metal electrode part 621A. The elastomeric electrode part 621B does not cover a side edge surface S3, positioned on the side of the second electrode 622, in the metal electrode part 621A.

Note that in the present embodiment, the elastomeric electrode part 621B does not cover the entire side edge surface S3, positioned on the side of the second electrode 622, in the metal electrode part 621A, as described above, but, the present embodiment is not limited to this. It is also possible that in the side edge surface S3, positioned on the side of the second electrode 622, in the metal electrode part 621A, a portion other than a boundary portion SP3 between the metal electrode part 621A and the front surface of the base 611, is covered by the elastomeric electrode part 621B. Specifically, it is preferable to create a state where the above-described boundary portion SP3 is exposed to the outside. This makes it possible to effectively generate an airflow.

(Second Electrode 622)

In the airflow generation device 6, the second electrode 622 is different from the first electrode 621, and is an internal electrode provided inside the base 611, as illustrated in FIG. 2 and FIG. 3. The second electrode 622 is formed of a metal material of, for example, copper, nickel, stainless steel, titanium, molybdenum, tungsten, or the like.

The second electrode 622 is a plate-shaped body, and is provided between the first base part 611A and the second base part 611B in the base 611. The second electrode 622 linearly extends in an extending direction (y direction, first direction) in which the first electrode 621 extends.

Further, the second electrode 622 is disposed to be arranged side by side with the first electrode 621 in a direction (x direction, second direction) orthogonal to the extending direction (y direction) of the first electrode 621 on the front surface of the base 611. Here, the second electrode 622 is disposed so that a portion thereof faces the first electrode 621 via the first base part 611A, in a direction (z direction) perpendicular to the front surface of the base 611.

[Configuration and the Like of Voltage Application Unit 62]

As illustrated in FIG. 2 and FIG. 3, the voltage application unit 62 is electrically connected to the airflow generation device 6 via the connecting part 63, and applies a voltage between the first electrode 621 and the second electrode 622.

The voltage application unit 62, being a discharge power supply, includes a power supply device (whose illustration is omitted) disposed on a blade root portion of the windmill blade 42, for example, and performs application of voltage by using the power supply device (whose illustration is omitted).

The voltage application unit 62 applies a voltage between the first electrode 621 and the second electrode 622, in accordance with a control signal output from a control unit (whose illustration is omitted). Accordingly, on the front surface (upper surface) of the airflow generation device 6, air is turned into a plasma by a barrier discharge, to thereby generate an airflow (plasma-induced flow). For example, a high-frequency voltage after being subjected to pulse modulation by a low-frequency pulse-modulated wave is applied between the first electrode 621 and the second electrode 622, and an airflow is intermittently generated. The airflow is induced so as to flow from the first electrode 621 side to the second electrode 622 side, resulting in that the occurrence of separated flow is suppressed.

Here, the voltage application unit 62 is configured to apply a voltage independently to each of the plurality of airflow generation devices 6 (refer to FIG. 1), for example. For instance, the voltage application unit 62 applies the voltage independently to each of the plurality of airflow generation devices 6 by synchronizing the voltage with separation vortices generated at different periods in the blade span (blade width) direction.

[Configuration and the Like of Connecting Part 63]

As illustrated in FIG. 2 and FIG. 3, the connecting part 63 includes a pair of connecting wires 631 and 632, and electrically connects between the first electrode 621 and the voltage application unit 62, and between the second electrode 622 and the voltage application unit 62.

Concretely, in the connecting part 63, one connecting wire 631 has one end electrically connected to the first electrode 621, and the other end electrically connected to the voltage application unit 62. Here, the one end of the one connecting wire 631 is electrically connected to the metal electrode part 621A of the first electrode 621, but, the one end may also be electrically connected to the elastomeric electrode part 621B.

Further, in the connecting part 63, the other connecting wire 632 has one end electrically connected to the second electrode 622, and the other end electrically connected to the voltage application unit 62.

Although the illustration is omitted, a plurality of sets of the pair of connecting wires 631 and 632 are provided by corresponding to the respective plural airflow generation devices 6 which form the wind power generation system 1 (refer to FIG. 1), and are disposed so as to extend from a side of the hub 41 to a tip side of the windmill blade 42 of the rotor 4.

[Manufacturing Method of Airflow Generation Device 6]

Description will be made regarding a manufacturing method of manufacturing the above-described airflow generation device 6.

First, the metal electrode part 621A of the first electrode 621 is provided on the upper surface of the first base part 611A which forms the base 611. Along with this, the second electrode 622 is provided on the lower surface of the first base part 611A. Here, for example, sheets each formed of a metal material are bonded to the first base part 611A, to thereby provide each of the metal electrode part 621A of the first electrode 621 and the second electrode 622.

Next, the elastomeric electrode part 621B of the first electrode 621 is provided on the upper surface of the first base part 611A. Here, the elastomeric electrode part 621B is formed by performing coating of coating solution containing components which compose the elastomeric electrode part 621B. For example, the elastomeric electrode part 621B is formed by performing coating of coating solution in which the elastomeric material is dissolved and the conductive particle is dispersed.

Next, the second base part 611B that forms the base 611 is provided on the lower surface of the first base part 611A. Here, for example, the second base part 611B is disposed by being bonded to the lower surface of the first base part 611A.

The aforementioned airflow generation device 6 is completed in the above-described manner.

Note that it is also possible to manufacture the airflow generation device 6 through a manufacturing procedure other than the above-described manufacturing procedure. For example, in the above-described manufacturing procedure, it is also possible to dispose the second base part 611B before providing the elastomeric electrode part 621B of the first electrode 621 on the upper surface of the first base part 611A. Further, it is also possible to complete the airflow generation device 6 in a manner that the second electrode 622 and the first base part 611A are sequentially provided on the upper surface of the second base part 611B, and then the metal electrode part 621A and the elastomeric electrode part 621B are sequentially provided on the upper surface of the first base part 611A to form the first electrode 621. Other than the above, it is also possible to manufacture the airflow generation device 6 through various types of processing such as presswork and extrusion-forming work, for example.

[Operations and Effects of Elastomeric Electrode Part 621B]

Operations and effects of the elastomeric electrode part 621B provided in the above-described airflow generation device 6 will be described.

Figure 4:
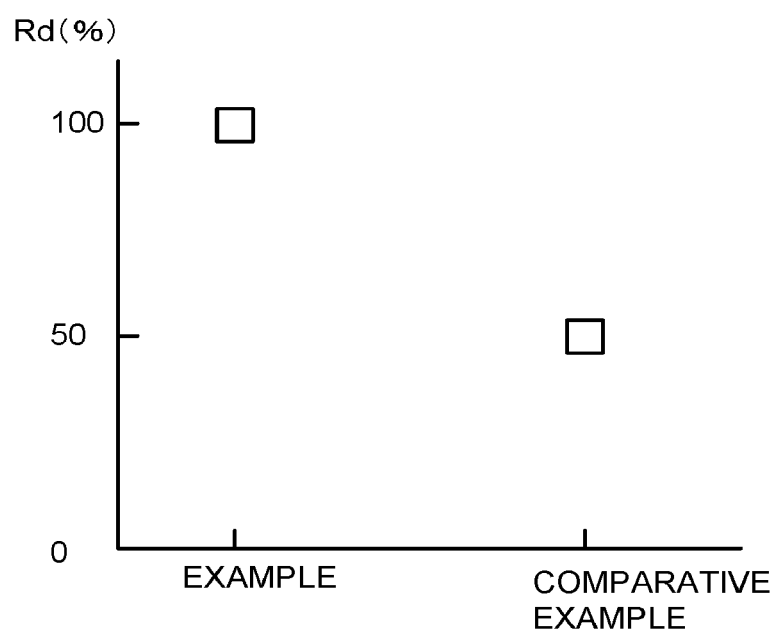
FIG. 4 is a view illustrating operations and effects of an elastomeric electrode part in the airflow generation device according to the embodiment.

FIG. 4 is a view illustrating operations and effects of the elastomeric electrode part 621B in the airflow generation device according to the embodiment. In FIG. 4, a vertical axis indicates a ratio Rd (%) of discharge length. The ratio Rd (%) of the discharge length corresponds to a ratio of a length L1 of a portion in which a discharge occurs to generate an airflow, to an entire length L0 of the airflow generation device 6 (namely, Rd=(L1/L0)×100).

In FIG. 4, an example corresponds to the airflow generation device 6 in which the elastomeric electrode part 621B is provided, as in the above-described embodiment.

Concretely, in the example, a sheet made of a silicone resin having a thickness of 0.5 mm was first prepared as the first base part 611A. Further, a copper ribbon was provided, as the metal electrode part 621A of the first electrode 621, on the upper surface of the first base part 611A, and a copper ribbon was provided, as the second electrode 622, on the lower surface of the first base part 611A. Here, by bonding the copper ribbons each having a length of 100 mm, a width of 5 mm, and a thickness of 0.1 mm, the metal electrode part 621A of the first electrode 621, and the second electrode 622 were respectively provided. Next, there was prepared coating solution containing a silicone resin as an elastomeric material dissolved therein and a silver fine particle as a conductive particle dispersed therein, and by coating the coating solution onto the upper surface of the first base part 611A, the elastomeric electrode part 621B of the first electrode 621 was formed. Next, a sheet made of a silicone resin was bonded, as the second base part 611B that forms the base 611, to the lower surface of the first base part 611A. Accordingly, the airflow generation device 6 of the example was completed.

On the contrary, in a comparative example, an airflow generation device was completed in a similar manner to the above-described example, except that the elastomeric electrode 621B is not provided. Specifically, in the comparative example, the first electrode 621 has the metal electrode part 621A, but, it does not have the elastomeric electrode part 621B.

Further, a bending fatigue test was conducted with respect to the example and the comparative example. In the bending fatigue test, a distortion (1% distortion) was generated at a center portion in the longitudinal direction of the airflow generation device, to cause disconnection of the metal electrode part 621A. Thereafter, an alternating voltage of 7 KV was applied to the airflow generation device to generate a plasma, thereby generating an airflow.

As illustrated in FIG. 4, in the example, the ratio Rd (%) of the discharge length was 100%, in which the discharge occurred over the entire length L0 of the airflow generation device 6, to thereby generate the airflow. On the other hand, in the comparative example, the ratio Rd (%) of the discharge length was 50%, in which the discharge did not occur over the entire length L0 of the airflow generation device, and the airflow was generated at a position between one end and a center portion of the device.

In the example, although the disconnection occurred in the metal electrode part 621A, the elastomeric electrode part 621B has the flexibility higher than that of the metal electrode part 621A, and thus is difficult to be damaged. Accordingly, in the example, since the disconnected metal electrode part 621A is electrically connected by the elastomeric electrode part 621B, the first electrode 621 is in a conduction state over the entire length L0 of the airflow generation device 6. For this reason, the example is different from the comparative example, and it is possible to generate the airflow over the entire length L0 of the airflow generation device 6 in the example, as described above.

As can be understood from this result, in the airflow generation device 6 of the present embodiment, the elastomeric electrode part 621B includes the portion covering the metal electrode part 621A, so that even if the disconnection occurs in the metal electrode part 621A, the first electrode 621 can effectively secure the conduction state.

In particular, in the airflow generation device 6 of the present embodiment, the elastomeric electrode part 621B further covers a portion, on the front surface of the base 611, positioned on the opposite side of the second electrode 622 on the basis of the metal electrode part 621A. Accordingly, even if a portion, in the elastomeric electrode part 621B, formed on the upper surface of the metal electrode part 621A is broken due to the disconnection of the metal electrode part 621A, it is possible to effectively secure the conduction state of the first electrode 621, with the use of the portion positioned on the opposite side of the second electrode 622.

Therefore, in the wind power generation system 1 of the present embodiment, it is possible to effectively prevent the damage and the like of the airflow generation device 6 in the periphery of the moving body such as the windmill blade, so that the airflow generation device 6 can appropriately control the flow of fluid. As a result of this, it is possible to realize a stabilization of power generation for a long period, and at the same time, it is possible to maintain a high power generation efficiency.

Note that as described above, in the present embodiment, the elastomeric electrode part 621B is formed by dispersing the conductive particle in the elastomer. Accordingly, since a degree of freedom regarding a selection of the elastomeric material is increased, it is possible to appropriately improve the characteristic such as the weather resistance.

Further, in the present embodiment, the conductive particle in the elastomeric electrode part 621B is formed of the metal material. Accordingly, it is possible to effectively improve a mechanical strength of the elastomeric electrode part 621B.

Modified Example

Although the above-described respective embodiments describe the case where the airflow generation device 6 is used for suppressing the occurrence of separated flow in the windmill blade 42, they are not limited to this. It is also possible to use the airflow generation device 6 for suppressing an occurrence of separated flow in a moving body such as a vehicle, other than the windmill blade 42. Specifically, it is also possible to dispose the airflow generation device 6 on a portion, at which the separated flow may occur, on a surface on which a fluid flows in an object.

According to at least one embodiment described above, since the elastomeric electrode part includes the portion covering the metal electrode part, it is possible to sufficiently secure the conduction state of the electrode in the airflow generation device disposed on the moving body such as the windmill blade.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An airflow generation device comprising:
    a base formed of a dielectric having a flexibility;
    a first electrode provided on a front surface side of the base, extending in a first direction on the front surface of the base; and
    a second electrode provided inside the base, extending in the first direction at a position inside the base, and being disposed to be arranged side by side with the first electrode in a second direction orthogonal to the first direction on the front surface of the base, the airflow generation device being configured to generate an airflow when a voltage is applied between the first electrode and the second electrode,
    wherein the first electrode comprises:
        a metal electrode part formed of a metal material, and
        an elastomeric electrode part formed by an elastomeric material, and having a conductivity, the elastomeric electrode part being formed so as to cover at least one of an upper surface and a first side edge surface in the metal electrode part,
    wherein a second side edge surface has a boundary portion positioned on a side of the front surface of the base, and
    wherein the boundary portion is not covered by the elastomeric electrode part, and exposed to the outside.

2. The airflow generation device according to claim 1, wherein the elastomeric electrode part further covers a portion, on the front surface of the base, positioned on an opposite side of the second electrode based on the metal electrode part.

3. The airflow generation device according to claim 1, wherein the base comprises:
    a first base part including the first electrode provided on a front surface thereof, and the second electrode provided on a rear surface thereof, and
    a second base part provided on the rear surface of the first base part to cover the second electrode.

4. The airflow generation device according to claim 1, wherein the elastomeric electrode part is formed by dispersing a conductive particle in an elastomer.

5. The airflow generation device according to claim 4, wherein the conductive particle in the elastomeric electrode part is formed of a metal material.

6. A wind power generation system comprising:
    a windmill blade,
    wherein the airflow generation device according to claim 1 is disposed on the windmill blade.

* * * * *